(No Model.)

G. S. FRAZEY.
CREAMING CAN.

No. 313,310.  Patented Mar. 3, 1885.

Witnesses:
Phil L. Dietrich
E. D. Hough

Inventor:
Guy S. Frazey
per Chas J Gooch
Attorney.

UNITED STATES PATENT OFFICE.

GUY S. FRAZEY, OF JERSEY CITY, NEW JERSEY.

CREAMING-CAN.

SPECIFICATION forming part of Letters Patent No. 313,310, dated March 3, 1885.

Application filed February 14, 1884. (No model.)

*To all whom it may concern:*

Be it known that I, GUY S. FRAZEY, a citizen of the United States of America, residing at Jersey City, in the county of Hudson and State of New Jersey, have invented certain new and useful Improvements in Creaming-Cans, of which the following is a specification, reference being had therein to the accompanying drawings.

My invention consists in certain improvements in the construction of milk pails and pans whereby the advantages of either deep or shallow setting are readily obtainable, the milk properly ventilated, and the flow of a cooling medium across said pail permitted without submerging the can or allowing any of such cooling agent coming in contact with the milk.

Figure 1:
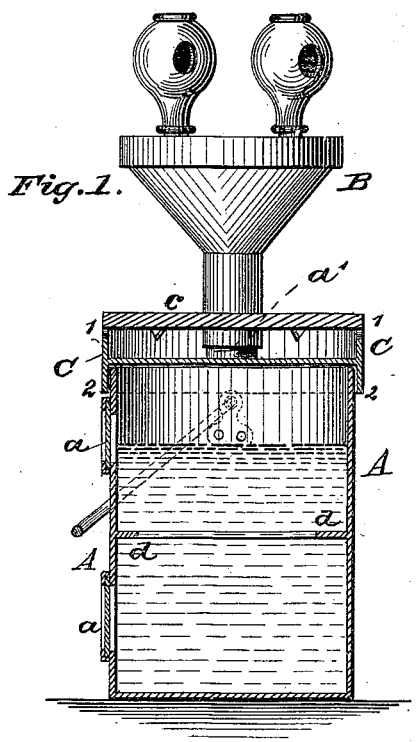
Figure 2:
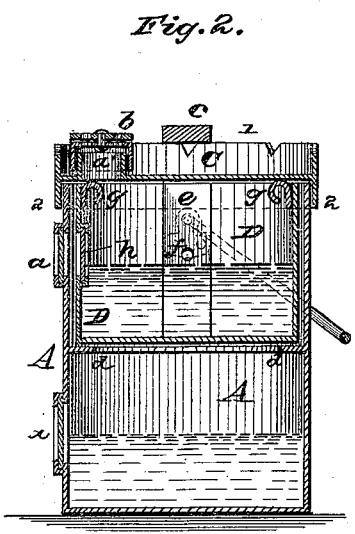
Figure 3:
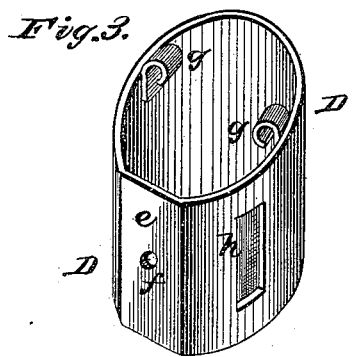
Figure 4:
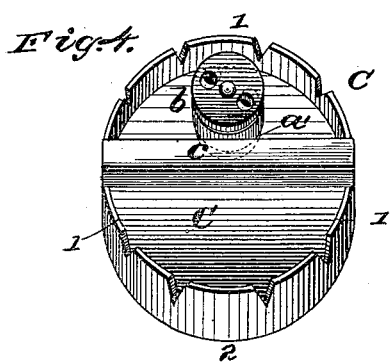

In the drawings, Figure 1 represents in vertical section my improved can or pail adapted for deep setting. Fig. 2 is a similar view showing its adaptability for shallow setting. Fig. 3 represents the shallow-setting pan separately. Fig. 4 is a perspective view of the top or cover of the pail.

A represents a pail or other vessel, of oblong, square, round, or other desired shape, for receiving the milk as it passes from a strainer, B. While this pail is adapted, by means of an upwardly-extending tube, $a'$, to receive an ordinary straining device, I have in the drawings shown such a strainer as I prefer to use, and for which I have made application for patent on the 16th day of June, 1882, Serial No. 64,256. In the side of this pail or receiver A is a window, composed of a strip of glass or other transparent material, $a$, by means of which the height of the milk within such receiver can be readily ascertained.

C represents the lid or cover of the can or receiver. This cover is formed with upwardly and downwardly depending flanges 1 2, as shown, notches being formed in the top of flange 1, to allow water to be distributed over the unsubmerged part of the can or receiver, and with an upwardly-extending tube, $a'$, which may be central of the cover or to one side thereof, as desired, and has a cap, $b$, having ventilating-openings in the top, and provided with a similarly-perforated rotating disk, in order that communication between the interior of the can and the outer air may be unimpeded or entirely prevented, as desired.

$c$ represents a strip of some suitable stout material, preferably wood, which is placed across the top of the can or receiver, as shown, with its outer edges resting upon the rim 1 thereof. The object of this rim 1 is to afford a seat upon which, when milking, the person may safely sit without bending the cover or the receiver, as by this arrangement the weight of such person is evenly distributed around the edges of the pail or receiver and the sagging down of the cover and the edges of the pail or receiver prevented; also to hold or retain about one-half to one inch of cool water all the time the milk or cream is being raised. Upon the upper end of this tube $a'$ is formed a screw-thread to admit of the screw-threaded lower end of the straining-vessel B being screwed thereon; but such screw-thread may be dispensed with, if desired.

$d$ represents a rim or flange formed interiorly of the pail A, and extending circumferentially around the same, for the purpose of supporting the pan D. This pan D may be of any desired depth, although it is believed that a depth equal to about one-half the depth of the pail A will be found the most desirable; or, if desired, two or more of such pans may be employed, each of less depth than that shown in the drawings, said pans in such case being placed the lower one upon the rim or flange $d$, and those above resting upon the top of the lowest pan. Such a duplication of the pan D in the receiver or pail would be found advantageous by those who practice shallow setting, as thereby the volume of milk can be divided so as to increase the surface to which the cream can rise, and the distance to which the cream must rise is less than when only one pan is used.

When it is desired to use two or more pans, the flange $d$ would be placed near the bottom of the receiver or can, to afford room for the additional pan or pans resting upon or in each other.

The pan D is of corresponding shape to the shape of the pail A, except that at one portion of its circumference it is formed straight or flat, as at $e$. A hole or opening, $f$, is formed in this flat portion, in order that when the milk flowing into said pan rises to a level with the opening it shall flow out therethrough to and into the inclosing pail. By forming one portion of the pan with a flat surface it will be readily seen that the flow of milk through the hole $f$ to the pail A will be free and unimpeded. This hole will be closed by a slide-valve, to prevent cream or milk from pouring through when being skimmed or being removed.

$g$ represents loops or handles attached to the inner face of the pan D, in order that said pan may be readily raised from the rim or flange $d$, or lowered within the pail A until its bottom rests upon said flange. As it is designed to make this pan of equal, or nearly equal, circumference to that of the pail, the attaching of the loop $g$ to the interior of the pan will allow of said pan being readily slid up and down within the pail.

$h$ represents a strip of glass or other transparent material placed in the side of the pan, in order that when the pan is placed within the pail with said strip $h$ opposite to the transparent strip $a$ (its normal position) by looking through said strips the extent to which the cream has risen within the pan can be readily ascertained.

It is well known that the caseine and other qualities contained in milk that it is desired to extract therefrom for use in butter and cheese making are obtainable more readily and in larger quantities by means of the "shallow-setting" method than by the "deep-setting;" and it is also well known in the trade that butter and cheese manufactured from milk subjected to the shallow-setting method are superior to and bring a higher price in market than do similar articles produced from milk subjected to the deep-setting method, owing to the added richness of the product of the shallow-setting method. By my present improvements I am enabled at will to readily employ either of these methods by a very simple and efficient arrangement, and at a cost not exceeding that at which deep setting alone is ordinarily accomplished.

In practice, if shallow setting is desired, the pan D is placed within the pail A, with its bottom resting upon the flange $d$, and the strip of glass or other transparent material, $h$, in said pan opposite to the similar transparent strip, $a$, in the pail. The cover or lid C is then applied, and the strainer B described in my application before referred to (or any other suitable straining device) placed in communication with the tube $a'$. The milk is then caused to pass through said strainer, either as it is drawn from the cow or afterward, by pouring it therein down through said tube $a'$ into the pan D, into which it will flow and remain until the orifice therein is reached, when any additional milk will flow therefrom through said orifice to the inclosing pail.

Should it be desired to secure deep setting instead of shallow setting, the pan D is not placed within pail A, but the milk allowed to flow freely and directly within the pail through the strainer and tube before described.

While this pail and pan can be readily used either with or without a suitable straining device, still it is my intention to use the same in conjunction with the milking and straining devices described in my application for patent before referred to, and also in conjunction with an arrangement for cooling the milk and raising the cream thereon, shown and described in an application for patent filed on even date herewith.

I am aware that a milk-can has been constructed with a cover having a rim or flange having perforations to permit of water flowing off said cover, and also that a can-cover has been constructed with an upwardly-extending tube or cup provided with a perforated cover and an independent imperforate cap adapted to fit over said perforated cover.

I am aware that cans have been constructed with a cover having an upwardly-extending perforated tube, some provided with an imperforate cap adapted to fit over and close such perforations; also, that a can has been provided with a tube having perforated side walls and a surrounding refrigerating-box provided with a cover in which is located a pivotal perforated disk; and that a vat has been constructed with a cover upon which an upwardly-extending tube is formed, provided at its upper end with a pivotal valve, by means of which such tube is opened and closed, and such I do not claim. I am not, however, aware of any cover for an ordinary milk-can constructed with an upwardly-extending tube having imperforate side walls, and provided with a cap having a perforated top and a disk pivoted thereto, and having perforations corresponding with the perforations in said cap-top, whereby on the removal of said cap the tube is adapted to receive the neck of a straining-vessel of similar construction to that shown in the drawings hereunto attached, (and which is the subject of another application for patent, as herein referred to,) and when such cap is applied to the tube and the disk opened the contents of the can can be ventilated, and when such disk is closed the can is sealed, so that whatever the oscillation of the can, even to the extent of the falling over thereof, the contents cannot spill.

What I claim as new herein is—

1. The combination of the pail A, having on its inner side a flange or rim, $d$, and a cover having an upwardly-extending tube, $a'$, a perforated cap, $b$, adapted to fit said tube, and a rotatable disk pivotally connected with said cap, and having ventilating-openings therein adapted to register with the perforations in the cap, and the pan D, having loops or handles $g$, flat face $e$, and orifice $f$, substantially as and for the purpose set forth.

2. The combination of the pail A, having a flange or rim, *d*, window *a*, and a cover having a ventilating-opening provided with a perforated cap, *b*, and a disk pivotally connected with said cap, and having a series of perforations adapted to register with the perforations in said cap, and the pan D, having loops or handles *g*, flat face *e*, orifice *f*, and transparent strip *h*, substantially as and for the purpose set forth.

3. The combination of a pan, D, having loop *g*, flat face *e*, and orifice *f*, and a pail, A, having suitable means for supporting said pan therein, substantially as set forth.

In testimony whereof I affix my signature in presence of two witnesses.

GUY S. FRAZEY.

Witnesses:
CHAS. J. GOOCH,
E. P. HOUGH.